June 23, 1953           P. TEAL           2,642,961
AUTOMATIC BRAKE HITCH ASSEMBLY FOR TRAILERS
Filed March 2, 1951
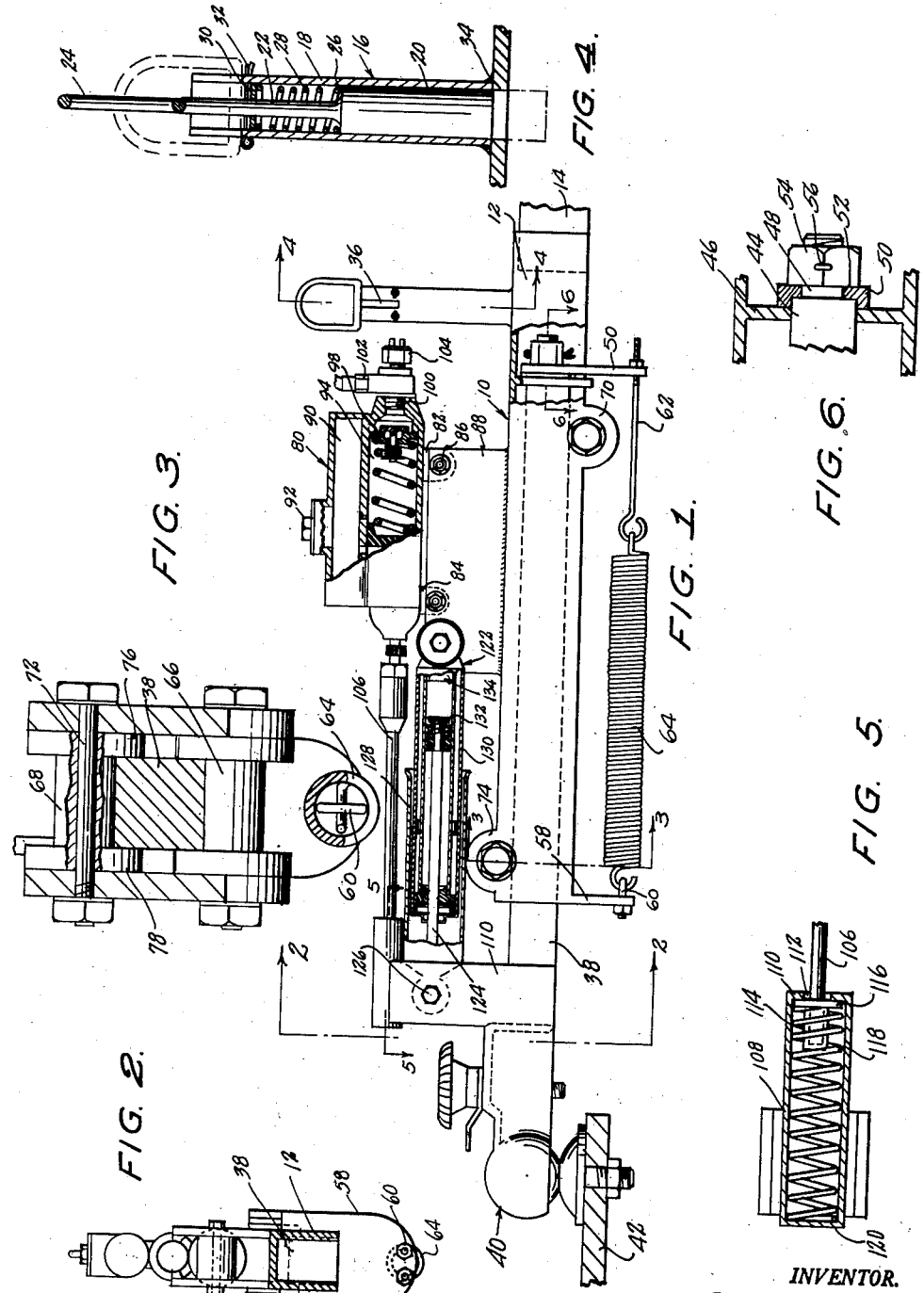
INVENTOR.
PAUL TEAL,
BY
McMorrow, Berman + Davidson
ATTORNEYS.

Patented June 23, 1953

2,642,961

UNITED STATES PATENT OFFICE 2,642,961

AUTOMATIC BRAKE HITCH ASSEMBLY FOR TRAILERS

Paul Teal, Walla Walla, Wash.

Application March 2, 1951, Serial No. 213,618

3 Claims. (Cl. 188—112)

This invention appertains to improvements in braking systems for trailers and especially relates to improvements in brake actuators for trailers, which are coupled to and drafted by automotive vehicles, the improvements broadly residing in the provision of a brake hitch, which forms a connection between the trailer and the automotive or towing vehicle.

The primary object of this invention is to provide an automatic actuator for setting the brakes of a trailer, which is attached to the hitch between the vehicle and the trailer and which is reactive to changes in the braking effect of the vehicle for producing a synchronized braking condition of the trailer, without having any connection with the braking system of the towing vehicle.

Another object of this invention is to provide a brake hitch, which forms a connection between the trailer and a towing vehicle and which permits normal movements of the trailer, in response to the movements of the vehicle, but which automatically applies the brakes of the trailer, as the speed of the trailer increases beyond that of the towing vehicle.

Another object of this invention is to provide a brake actuator for the brakes of a trailer, which is automatically responsive to a forward free impetus of the trailer, in excess of the forward movement of the towing vehicle and which automatically releases the trailer brakes, upon and during a consistent speed, between the trailer and the towing vehicle.

A further object of this invention is to provide a compact and inexpensive hitch, which is provided with a brake actuating mechanism for applying the brakes of a trailer, the hitch being usable for establishing a draft connection between any trailer and any power towing vehicle.

These and ancillary objects and structural features of merit are attained by this invention, the preferred embodiment of which is set forth in the following description and illustrated in the accompanying drawing, wherein:

Figure 1 is a side elevational view of a braking hitch, constructed in accordance with the principles of this invention, with the shock absorber and master cylinder shown in section;

Figure 2 is a transverse sectional view taken on line 2—2 of Figure 1;

Figure 3 is an enlarged transverse sectional view taken on line 3—3 of Figure 1;

Figure 4 is a detailed sectional view taken on line 4—4 of Figure 1;

Figure 5 is a detailed longitudinal vertical sectional view taken on line 5—5 of Figure 1, and, Figure 6 is an enlarged detail sectional view taken on line 6—6 of Figure 1.

Referring now more particularly to the accompanying drawing, the hitch, generally indicated at 10, is provided to form a connection between a trailing vehicle or trailer (not shown) and a towing vehicle (not shown) and, in establishing a coupling or hitch connection between the vehicles, to provide means for actuating the braking mechanism of the trailer.

The hitch includes an open ended housing or channel bar 12, which has one of its open ends adapted to receive the projecting end of a trailer tongue 14. Spring urged locking means is operatively mounted on the end of the channel bar, adjoining the trailer tongue, for coupling the channel bar to the tongue.

As seen in Figure 4, the connecting means 16 between the tongue 14 and the bar 12 includes an upstanding tubular member 18, which is formed on the web portion of the channel bar 12 and which is welded at its lower end to the web portion. A plunger 20 is axially slidable in the tubular member and is formed with an upper axially reduced end 22, which terminates in an enlarged ring 24. The upper end of the plunger 20, adjacent to the axially reduced end 22, forms a lateral shoulder 26, which acts as an abutment for a spring 28. The spring 28 is concentrically disposed on the reduced end 22 and bears against a stop 30, which is transversely disposed in the tubular member and securely locked, against upward movement therein, by transversely disposed cotter pins 32. The spring 28 biases the plunger 20 downwardly in the tubular member and through a vertical opening 34 formed in the web portion of the channel bar, so that the plunger is urged into positive locking engagement in a suitable opening formed vertically in the trailer tongue 14. The spring is rendered operative to urge the plunger into locking engagement of the trailer tongue 14 by positioning the ring 24 in a pair of diametrically opposed axial slots 36, which are formed in the upper end of the tubular member, as seen in dotted lines in Figure 4. To retain the plunger 20 in a raised position within the tubular member 18, it is only necessary to position the ring, as seen in Figure 1, so that the lower portion thereof, which is formed straight, rests upon the upper edge of the tubular member and is disposed at right angles to the diametrically opposed slots 36.

A pull bar 38 is arranged longitudinally of and within the channel bar or housing 12 and has one end inwardly of and spaced from the one open end of the housing 12 which detachably receives the projecting end of the trailer tongue 14 and has the other end exteriorly of and spaced from the other open end of the housing 12, the pull bar 38 and the housing 12 being connected together for extensible movement relative to each other. The other end of the pull bar 38 is formed with a conventional ball type trailer hitch 40, adapted to securely engage the hitch bar 42 of a vehicle. The pull bar 38 is rectangular in cross section and is slidably disposed through a rectangular opening 44 in a transverse web 46, which extends between the opposing side walls of the channel bar. The pull bar 38 terminates at its one or inner end in an axially reduced circular lug 48, which is disposed through a transverse bore 52 in the upper end of a depending ear 50. The bore 52 is counterbored to accommodate the inner end of the pull bar, as seen in Figure 6. The terminal of the lug 48 is exteriorly threaded for the threaded reception of a locking nut 54, which abuts the ear 50 and securely clamps the ear in engagement of the end of the pull bar in the web 46. A cotter pin 56 is transversely disposed, by means of suitable openings, through the nut and through the lug 48, to prevent accidental dislodgement of the nut.

The ear 50 depends transversely from the pull bar and is transversely disposed between the opposing sides of the channel bar, the lower end of the ear being extended downwardly from the lower edges of the opposing sides of the channel bar. A parallel and coextensive ear 58 is formed on the outer end of the channel bar. The ears 50 and 58 are formed with longitudinally aligned openings, the ear 58 accommodating, by means of the opening formed therein, an eye 60 and the ear 50 receiving a toggle bolt 62. A spring 64 is anchored between the eye 60 and the eye end of the toggle bolt 62, the spring 64 functioning to resist the relative movement of the channel bar 12 and the pull bar 38, as the two parts move apart. The spring not only resists the relative movement of the channel bar and the pull bar to thereby prevent application of the brakes of the trailer, in a manner to be described, against high gear compression but also, permits backing of the trailer, under the drive of the towing vehicle, provided that the load in the trailer is not too heavy and the trailer is operating under normal conditions.

To assist in retaining the channel bar 12 and the pull bar 38 in proper telescopic arrangement, so that extensible movements of the two parts can be effected, corresponding to the movements of the towing vehicle and the trailer, without binding of the two parts, friction rollers 66 and 68 are provided. The rollers are disposed transversely between the sides of the channel bar, the roller 66 being circumposed on the intermediate portion of a bolt member, which is disposed transversely between a pair of cooperative ears 70, the ears being disposed in opposed relationship and depending in parallelism from the lower edges of the opposing sides of the channel bar. Similarly, the roller 68 is circumposed on a bolt 72, which is disposed transversely between a pair of upstanding parallel ears 74, the ears 74 being formed on the upper edges of the opposing sides of the channel bar and projecting upwardly above the web portion thereof. The ears 74 are formed at the outer end of the channel bar, with the ears 70 being disposed adjacent to the inner end of the channel bar and extending downwardly therefrom.

Both of the friction rollers 66 and 68 are provided with annular end flanges 76 and 78, so that the opposing sides of the pull bar 38 are engaged with the inner confronting surfaces of the flanges, the upper and lower surfaces of the pull bar being engaged with the peripheral surfaces of the rollers. In effect, the flanges define guide-ways for the sliding reception of the upper and lower portions of the pull bar. By providing the friction rollers, not only are the two parts retained in proper relationship and alignment to obviate binding thereof but also, frictional losses are reduced to a minimum and the brake actuating mechanism is capable of immediate response to the collapsing telescoping movement of the channel bar and pull bar.

Operatively mounted on the channel bar 12 and actuated by the relative movement of the pull bar and channel bar is a conventional master cylinder 80. The underside of the master cylinder is provided with a pair of depending ears 82 and 84 which are bolted by fasteners 86 between a pair of upstanding plates 88, formed on the web portion of the channel bar. The master cylinder 80 is of a conventional construction, including a reservoir 90, which is provided with a filler plug 92 and a work cylinder 94, which is in communication with the reservoir and within which a piston 96 is workably disposed. A conventional double acting valve 98 is operatively mounted in the working chamber or cylinder and an outlet 100 extends from the rearward end of the working chamber, the outlet being in communication with a coupling 102 for affixing a flexible conduit thereto. The conduit (not shown) is connected by any suitable means to the brake cylinders on the wheels of the trailer. For use in automatically closing a circuit for a stop light on the rear of the trailer, a switch 104 is provided and is mounted, adjacent to the outlet 100, the switch being fluid operated and being actuated, when the brakes are applied, to complete the circuit for the stop lights.

A piston rod 106 projects forwardly from the work chamber of the master cylinder and has its outer end operatively associated with a damping means, which effects a soft action of the application of the brakes. In this respect, a cylinder 108 is cradled in the upper end of an upstanding member 110, formed on the pull bar 38. The cylinder is securely fixed on the upper end of the upstanding member 110 and is disposed in axial alignment with the piston rod 106 for the slidable reception thereof. Thus, the inner end 110 of the cylinder is provided with an opening 112, through which the piston rod 106 is slidably disposed. The piston rod is socketed in a cylindrical socket 114, which is formed with an annular collar 116 providing an abutment surface for a spring 118. The opposing end of the spring bears against the forward closed end 120 of the cylinder and the spring is operative to resist the sliding movements of the piston rod 106 into the cylinder 108, as the members 12 and 38 telescope together. Thus, the spring 118 forms a damping means and provides a brake softener.

Means is provided and is operatively connected between the channel bar and the pull bar for effecting a fast application of the brakes, under the operative action of the master cylinder, but also insuring a slow release of the brakes. The means includes a conventional type direct acting shock absorber, which, in operation, will avoid a fast to and fro motion of the piston rod of the master cylinder, which would be productive of a jerking motion imposed on the trailer and the towing vehicle. The shock absorber 122 includes a piston rod 124, which is formed with an eye journaled on a bolt 126, which is transversely disposed in the upstanding member 110. A dust cup 128, which is cylindrically shaped, is affixed at its closed end to the bolt 126 and projects outwardly therefrom, the dust cap being concentric to the piston rod 124, which is slidingly and sealingly disposed through the end of a double walled cylinder 130 which has an eye journaled on the plates 88. The piston rod is provided with a piston 132, including a rebound valve assembly. A compression valve assembly 134 is formed in the opposing end of the cylinder and the rebound valve assembly and the compression valve assembly are operative to control the movements of the piston rod in the cylinder, during the compression and rebound strokes, so that the piston rod displaces a portion of the fluid from the cylinder into the outer portion thereof and the displaced fluid in a return flow is drawn into the inner chamber from the surrounding reservoir through the intake relief valve, which is formed as a part of the compression valve assembly in the cylinder.

In operation, the pull bar is connected by the ball hitch assembly 40 to the hitch bar 42 of a towing vehicle and the trailer tongue 14 is secured by the locking means 16 to the channel bar 12. Thus, a draft connection is established between the towing vehicle and the trailer, which draft connection enables the towing vehicle to pull the trailer.

When the brakes are applied by the towing vehicle, the trailer will approach the towing vehicle, at an increased rate of speed, and the channel bar will telescope on the pull bar. This will immediately effect an operation of the master cylinder, which will produce a fluid pressure in the brake cylinders of the trailer wheels and thereby apply the brakes of the trailer wheels. The shock absorber unit 122 is provided to permit a fast application of the brakes but a slow release thereof, thus avoiding a fast to and fro motion of the trailer relative to the towing vehicle, which would produce a jerking on the trailer and the towing vehicle.

While the instant invention has been exemplarily described and illustrated, as operatively associated with hydraulic brakes for the trailer, obviously, it could be used with mechanical or air brakes.

Having thus described this invention, what is claimed is:

1. A hitch for connecting a towing vehicle to a trailer comprising an open ended housing having one of its open ends adapted to detachably receive the projecting end of a trailer tongue, a pull bar arranged longitudinally of and within said housing and having one end inwardly of and spaced from said one open end of said housing and having the other end adapted for detachable connection to a towing vehicle exteriorly of and spaced from the other open end of said housing, said pull bar and housing being connected together for extensible movements relative to each other, a master cylinder adapted to be operatively connected to the brake cylinders of a trailer arranged exteriorly of and in longitudinal spaced relation with respect to said housing and supported on said housing, said cylinder including a reciprocable piston working within said cylinder and a piston rod having one end secured to said piston and having the other end exteriorly of said cylinder, an upstanding member carried by said pull bar adjacent said other end of the latter, a closed ended damping cylinder supported on the upper end of said upstanding member, the other end of said piston rod extending slidably through one of the closed ends of said damping cylinder, damping means housed within said damping cylinder and operatively connected to said other end of said piston rod, and spring means operatively connected to said pull bar adjacent said one end thereof and to said housing adjacent said other open end of the latter for resisting relative extensible movements of said pull bar and housing.

2. A hitch for connecting a towing vehicle to a trailer comprising an open ended housing having one of its open ends adapted to detachably receive the projecting end of a trailer tongue, a pull bar arranged longitudinally of and within said housing and having one end inwardly of and spaced from said one open end of said housing and having the other end adapted for detachable connection to a towing vehicle exteriorly of and spaced from the other open end of said housing, said pull bar and housing being connected together for extensible movements relative to each other, a master cylinder adapted to be operatively connected to the brake cylinders of a trailer arranged exteriorly of and in longitudinal spaced relation with respect to said housing and supported on said housing, said cylinder including a reciprocable piston working within said cylinder and a piston rod having one end secured to said piston and having the other end exteriorly of said cylinder, an upstanding member carried by said pull bar adjacent said other end of the latter, a closed ended damping cylinder supported on the upper end of said member, the other end of said piston rod extending slidably through one of the closed ends of said damping cylinder, damping means housed within said damping cylinder and operatively connected to said other end of said piston rod, spring means operatively connected to said pull bar adjacent said one end thereof and to said housing adjacent said other open end of the latter for resisting relative extensible movements of said pull bar and housing, and shock absorbing means including a closed ended cylinder, a reciprocable piston working within said last named cylinder, and a piston rod having one end secured to said piston and having the other end slidably projecting out of one of the closed ends of said last named cylinder, said cylinder being positioned adjacent said master cylinder and supported upon said housing, the said projecting other end of said piston rod of said shock absorbing means being connected to said upstanding member below said damping cylinder.

3. A hitch for connecting a towing vehicle to a trailer comprising an open ended housing having one of its open ends adapted to detachably receive the projecting end of a trailer tongue, a pull bar arranged longitudinally of and within said housing and having one end inwardly of and spaced from said one open end of said housing and having the other end adapted for detachable connection to a towing vehicle exteriorly of and spaced from the other open end of said housing, said pull bar and housing being connected together for extensible movements relative to each other, a master cylinder adapted to be operatively connected to the brake cylinders of a trailer arranged exteriorly of and in longitudinal spaced relation with respect to said housing and supported on said housing, said cylinder including a reciprocable piston working within said cylinder and a piston rod having one end secured to said piston and having the other end exteriorly of said cylinder, an upstanding member carried by said pull bar adjacent said other end of the latter, a closed ended damping cylinder supported on the upper end of said member, the other end of said piston rod extending slidably through one of the closed ends of said damping cylinder, damping means housed within said damping cylinder and operatively connected to said other end of said piston rod, an ear exteriorly of said housing and dependingly connected to said one end of said pull bar, a second ear exteriorly of said housing and dependingly secured to said housing adjacent the other open end of the latter, and a coiled spring extending between and operatively connected to said first and second ears for resisting relative extensible movements of said pull bar and housing.

PAUL TEAL.

References Cited in the file of this patent

UNITED STATES PATENTS

| Number | Name | Date |
|---|---|---|
| 1,896,427 | Selvester | Feb. 7, 1933 |
| 2,101,600 | Sandul | Dec. 7, 1937 |
| 2,134,931 | Solerno | Nov. 1, 1938 |
| 2,149,188 | Shaffer | Feb. 28, 1939 |